United States Patent
Coulmeau et al.

(10) Patent No.: US 9,524,571 B2
(45) Date of Patent: Dec. 20, 2016

(54) METHOD FOR ASSISTING THE NAVIGATION OF AN AIRCRAFT WITH CORRELATION OF DYNAMIC INFORMATION WITH A 4D FLIGHT TRAJECTORY

(71) Applicant: THALES, Courbevoie (FR)

(72) Inventors: François Coulmeau, Toulouse (FR); Sonia Vautier, Toulouse (FR); Frédéric Bonamy, Pessac (FR)

(73) Assignee: THALES, Courbevoie (FR)

( * ) Notice: Subject to any disclaimer, the term of this patent is extended or adjusted under 35 U.S.C. 154(b) by 0 days.

(21) Appl. No.: 14/712,796

(22) Filed: May 14, 2015

(65) Prior Publication Data

US 2015/0332490 A1  Nov. 19, 2015

(30) Foreign Application Priority Data

May 16, 2014  (FR) ...................... 14 01105

(51) Int. Cl.
*G01C 21/00* (2006.01)
*G01C 23/00* (2006.01)
*G06T 11/20* (2006.01)
*B64D 43/00* (2006.01)
*G09G 5/36* (2006.01)

(52) U.S. Cl.
CPC .............. *G06T 11/206* (2013.01); *B64D 43/00* (2013.01); *G01C 21/00* (2013.01); *G01C 23/005* (2013.01); *G09G 5/36* (2013.01); *G06T 2210/32* (2013.01); *G06T 2210/61* (2013.01); *G09G 2380/12* (2013.01)

(58) Field of Classification Search
CPC combination set(s) only.
See application file for complete search history.

(56) References Cited

U.S. PATENT DOCUMENTS

| | | |
|---|---|---|
| 7,788,035 B2 * | 8/2010 | Clayson ................. G01W 1/00 702/130 |
| 8,332,084 B1 | 12/2012 | Bailey et al. |
| 2007/0179703 A1 | 8/2007 | Soussiel et al. |
| 2008/0021648 A1 | 1/2008 | Wilson |
| 2008/0180282 A1 | 7/2008 | Brosius |
| 2009/0109065 A1 | 4/2009 | Pinheiro |
| 2009/0204277 A1 | 8/2009 | Coulmeau et al. |

(Continued)

*Primary Examiner* — Yonel Beaulieu
(74) *Attorney, Agent, or Firm* — Baker & Hostetler LLP

(57) ABSTRACT

A method for assisting the navigation of an aircraft comprises: assembly by families of data by a processing unit of predetermined data and acquired data, including meteorological data, the families being predefined, each data value being associated with a time window of validity; formatting the data of the families to associate with each data value a type of graphical representation as text or a scalar, vector, surface, or volume; selection of families of data to be displayed; choice of a display time window for each family of data to be displayed; spatio-temporal discretization of the trajectory; spatio-temporal correlation of the discretized trajectory with each family of data as a function of the time windows of validity, in the display time windows of the family, to extract a sub-assembly from each family of data, by the processing unit; display of the sub-assemblies in a single representation on the same display screen.

7 Claims, 13 Drawing Sheets

(56) References Cited

U.S. PATENT DOCUMENTS

| | | | |
|---|---|---|---|
| 2010/0211306 A1* | 8/2010 | Varadarajan | G08G 5/006 |
| | | | 701/532 |
| 2011/0087428 A1 | 4/2011 | Barnetche et al. | |
| 2011/0098871 A1 | 4/2011 | Buchanan et al. | |
| 2011/0102192 A1 | 5/2011 | Batsakes et al. | |
| 2011/0285586 A1* | 11/2011 | Ferguson | G01S 19/04 |
| | | | 342/357.45 |
| 2012/0232785 A1 | 9/2012 | Wiesemann et al. | |
| 2013/0124089 A1* | 5/2013 | Herman | G01C 21/20 |
| | | | 701/528 |
| 2015/0360566 A1* | 12/2015 | Bas Gago | B60K 35/00 |
| | | | 340/971 |

* cited by examiner

FIG. 3a

CUSTOM DATA
NAME:
DATE BEGIN
DATE END
PRIORITY
TYPE

FIG. 3b

DATA PAGE
- METEO
- CLOUDS
- AREAS
- NAVAIDS & GNSS
- DAY/NIGHT
- CUSTOM

FIG. 3c

SELECTION
BY PRIO > P2
BY SEL
ALOFT AREA
START TIME
END TIME

METHOD FOR ASSISTING THE NAVIGATION OF AN AIRCRAFT WITH CORRELATION OF DYNAMIC INFORMATION WITH A 4D FLIGHT TRAJECTORY

CROSS-REFERENCE TO RELATED APPLICATION

This application claims priority to foreign French patent application No. FR 1401105, filed on May 16, 2014, the disclosure of which is incorporated by reference in its entirety.

FIELD OF THE INVENTION

The field of the invention is that of navigation aids for aircraft and, more precisely, of a dynamic information correlation aid with a 4D flight trajectory.

BACKGROUND

Aeronautical information is commonly supplied to the crew. This of course relates to weather information, but also to the other dynamic information likely to be encountered during the flight:
- state of the air spaces traversed (opening or closing times),
- MTO acronym for the expression Meteo: time projection of the minimum heights and distances with regard to the visibility in the approach phase (such as for example the back-up airports which must be adapted to the ETOPS criteria (Extended range Twin engine Operation Performance Standards, procedure allowing navigation in the case of an engine failure, with a given maximum time separation with respect to the support airports, this time separation being strongly linked to the force of the winds encountered) at the predicted potential landing time),
- representation of the time windows linked to the slots for landing or take-off,
- opening times of the airports (the Air France flight Tokyo—CDG for example flies very slowly in order to comply with the closing times of Tokyo and the opening times of Roissy),
- NOTAMs (acronym for the expression "Notification to AirMen") informing of particular activities within an area at a given time (for example, maintenance of a radio-navigation beacon within a given area for a given period of time),
- status of the satellite constellations used for calculating the position within a given area,
- opening/closing times of countries flown over,
- night start/end points,
- predicted traffic,
- times of validity of the oceanic tracks,
- wind and temperature forecasts by hour and altitudes,
- forecasts of other weather phenomena (clouds, ice formation regions, wet areas, storms, turbulence),
- in the case of tactical missions, variation of the hazards over time (anti-missile batteries, activation of detection systems, variation with time of the cloud cover for systems requiring vision, start/end of night, rendez-vous times with other aircraft for refuelling, patrol flights, etc.),
- window for rendez-vous with other aircraft,
- window for opening of borders,
- target time window,
- etc.

This aeronautical information is supplied to the crew in hardcopy form (manual, logs, charts, flight dossiers), or in electronic form by displaying on screens in the cockpit. This dynamic information is more difficult to manage than static information, since it is necessary to extrapolate and to correlate disparate pieces of information. Similarly, some of this information depends on the intended altitude of the aircraft throughout the flight, and here again requires a correlation. For example, the temperature, wind or cloud charts are provided by ranges of altitude; the predicted altitude of the aircraft at a location in its flight plan has to be estimated in order to be able to find the correct chart to be displayed.

In the current operations, the crew filters the information that does not apply and manages the applicable information manually. For example, they correlate the lateral and vertical flight plan information with the weather charts, by calculating at what time the aircraft is likely to enter into a weather area. This work is complex because several weather charts need to be crossed, and the predicted 3D position of the aircraft mentally visualized on these charts together with the time-dependent aspect.

Moreover, dynamic information such as the weather is subject to frequent updates: it needs to each time be mentally re-determined what the predicted weather will be at a given future time.

Similarly, the flight plan may be subject to modifications, here again requiring the calculations to be re-done.

A few initiatives are starting to emerge for managing these problems, either in the CDS (acronym for "Cockpit Display System"), the FMS (acronym for "Flight Management System") or the EFB (acronym for "Electronic Flight Bag"):

The document US2012/0232785 "Methods and Systems for dynamically providing contextual weather information" discloses a method allowing the aircraft icon to be virtually moved via a marker along the flight plan, i.e. to run the film of the flight in advance. The system determines the corresponding time; it is displayed on the screens according to the method. The rest of the dynamic aeronautical information displayed on the chart corresponds to the information valid at the time in question. This allows coherent information to be displayed, but only in the neighbourhood of the icon being virtually displaced as illustrated in FIG. 1. It can be seen in the figure that the information presented is only exact in the neighbourhood of the aircraft icon which is on the WPT5, since the static chart shown is that corresponding to the time closest to the time predicted for the aircraft icon. Thus, for example, the region Z1 which can in fact be traversed before 23:00 and after 06:00 is declared as accessible, whereas it will no longer be so at the time when the aircraft will arrive there. Similarly, it cannot be seen in the figure that a strong, turbulent, side wind will occur at the point WPT7. This method does not allow:
- the information relating to the flight to be assimilated at a glance, in its entirety,
- the variation of dynamic aeronautical information to be captured at a given moment; if this information changes and has an impact on the progress of the flight, the crew has to estimate at what time that will take place, and manually moves the aircraft icon in order to try and "find" the moment in time in question.

The document U.S. Pat. No. 8,332,084 "Four-dimensional weather predictor based on aircraft trajectory" discloses a method for merging spatio-temporal weather information, used to predict the weather along a 3D+time trajectory, the time being predetermined. The system determines the weather in the vicinity of a 4D (3D+time) trajectory. Then, it allows either this trajectory to be refined (by taking into account the correct wind at each point, at the predicted time), or a more optimized trajectory to be found, in the neighbourhood of the initial trajectory, using the predicted wind in a volume around the initial trajectory. This method does not allow a developing situation around the 4D trajectory to be presented in an effective manner since it does not display anything; indeed, the display on the current screens in 2D of a weather "volume" is not possible. It is just a method for calculating the FMS predictions. Moreover, it only takes into account the weather (wind, temperature, humidity, pressure).

The document US2011/0102192 "Displaying weather forecast for own air vehicle" provides a method for displaying the weather forecast on a screen on board the aircraft. The system allows a time period (or a time) to be selected via a input HMI. The display screen then displays the predicted position of the aircraft at the time in question and the weather situation corresponding to the time interval in which this time is situated. This does not allows the changes in dynamic aeronautical information with time to be seen at a given time; if this information changes and impacts the progress of the flight, the crew have to estimate at what time this will occur, to manually input the time in question in order to see both the predicted aircraft icon and the weather around this aircraft icon. There is no coherent display all along the flight path on a single screen.

The document US2011/098871 "Method and apparatus for updating winds aloft display as aircraft altitude changes" describes a method for displaying charts of winds as a function of the altitude, by selection of a rotary switch on the aircraft altitude. This allows the crew to choose altitudes on a display screen; the winds corresponding to the chosen level are then displayed. The time parameter is not integrated into this method. Moreover, the display takes place around the current aircraft and does not take into account the flight plan.

The document by the applicant US2009/0204277 "Method of estimating atmospheric data at any point of a path of an aircraft") discloses a method for calculating the most likely weather model (wind, pressure, temperature, humidity) at a given point of the flight path, by using a grid of winds and atmospheric models. This allows discrete wind data values to be plotted against atmospheric models, section by section along the flight plan, in order to determine the most probable wind at any point. However, this does not solve the problem consisting in displaying in an effective manner a developing situation around the 4D trajectory, since it calculates the wind at a given point of the trajectory and does not display it elsewhere. It is just a method for calculating FMS predictions.

The document by the applicant US2007/179703 "Process taking into account a local and favourable situation not conforming to a general meteorological forecast" discloses a method for warning of predicted unfavourable wind along a flight plan. The wind is calculated in 4D (on a 3D flight path including the time parameter, in other words the spatio-temporal variation of the wind) allowing the weather (vent, pressure, temperature) to be determined and forecast at any point of a flight plan. This therefore allows the segments of the flight plan to be determined where an unfavourable wind will exist and a diversion to be proposed at these points. However, as before, this does not solve the problem consisting in displaying in an effective manner a developing situation around the 4D trajectory since it predicts the wind at a given 3D point of the trajectory and does not display it elsewhere. It is just a method for calculating FMS or ground predictions.

Other types of information are not shown, with a range of time variation correlated with the predictions along the flight path. The extrapolations of data concerning the flight and their correlation with the predicted flight path are carried out manually.

The methods described in the aforementioned documents allow a correlation to be performed manually and at a given time: the crew chooses a geographical region on their flight plan, and the predicted weather information at this location at this time is displayed. However, this does not give an overall view of the trajectory, and makes the crew perform trial and error operations in order to estimate if a potential problem could exist at a given point.

SUMMARY OF THE INVENTION

The aim of the invention is to overcome these drawbacks.
One subject of the invention is a method for correlation of spatio-temporal information with a 3D+time trajectory, incorporating mechanisms for automatic and manual filtering of the level of information and of the desired time range around the trajectory, and including an improved representation of the time variation of geographical information.

More precisely, the subject of the invention is a method for assisting the navigation of an aircraft equipped with
  sensors,
  a spatio-temporal trajectory processor,
  means of storing predetermined data and data acquired in the course of navigation, including meteorological data,
  means of displaying the spatio-temporal trajectory and data, including the meteorological data, on the same display screen,
  a unit for processing the sensed, predetermined and acquired data and the trajectory.

It is mainly characterized in that it comprises the following steps:
  assembly by families of data by the processing unit of the predetermined data and of the acquired data, the families being predefined, each data value being furthermore associated with a time window of validity,
  formatting of the data of the families in order to associate with each data value a type of graphical representation in the form of text or of a scalar or of a vector or of a surface or of a volume,
  selection of families of data to be shown,
  choice of a display time window for each family of data to be shown,
  spatio-temporal discretization of the trajectory,
  spatio-temporal correlation of the discretized trajectory with each family of data as a function of the time windows of validity, within the display time windows of the said family, in order to extract a sub-assembly from each family of data by the processing unit,
  display of the sub-assemblies in a single representation on the same display screen.

This method allows:
  the information relating to the flight to be assimilated at a glance, in its entirety,
  the variation of dynamic aeronautical information to be captured at a given time; if this information changes and has an impact on the progress of the flight, the crew has to estimate at what time that will take place, and manually moves the aircraft icon in order to try and "find" the moment in time in question.

It allows spatio-temporal data to be determined that is coherent with the 3D trajectory displayed, by taking into account the time axis over forward time scales allowing the crew to capture on a single representation the predicted time variation of the situation, without however cluttering the displays, in order to preserve an optimum readability and appreciation of the situation.

Other advantages:

The solution allows the time scales around the predicted trajectory to be adjusted with the aim of assisting the decision (diversion, anticipated application of procedures, etc.).

The solution allows manual filtering of the degree of forward prediction to be displayed so as to provide either the predicted situation only, or its variation over a near time range and around the predicted times of passage along the trajectory, or a forward prediction over the time range of the complete flight.

The solution allows an aid to decision-making by applying itself to alternative work-around trajectories ("What if" scenario):

Presentation of the time-correlated information for ETOPS or diversion flight paths, Presentation of the time-correlated information for the work-around flight plan, Presentation of the time-correlated information for optional side routes, Presentation of the time-correlated information for subsequent flight plans, Presentation of the time-correlated information for work-around flight plans on "engine failure", Presentation of the time-correlated information for flight plans at different levels.

The choice of the families to be displayed may be predetermined or determined by the crew or automatically.

Priorities can be chosen for families and/or sub-families.

According to one feature of the invention, a degree of reliability being associated with data, the formatting step is furthermore carried out by degree of reliability.

The families of data are typically: a family of meteorological data and/or a family of geographical data and/or a family of navigational data and/or a family of data supplied by the crew.

Sub-families may be associated with data; the assembly step is then furthermore carried out by sub-families.

Another subject of the invention is a system for assisting the navigation of an aircraft which comprises:
  sensors,
  a spatio-temporal trajectory processor,
  means of storing predetermined data and data acquired in the course of navigation, including meteorological data,
  means of displaying the spatio-temporal trajectory and data, including the meteorological data, on the same display screen,
  a unit for processing the sensed, predetermined and acquired data and the trajectory,
  means of implementing the method such as described.

BRIEF DESCRIPTION OF THE FIGURES

Other features and advantages of the invention will become apparent upon reading the detailed description that follows, presented by way of non-limiting example and with reference to the appended drawings in which:

FIGS. 3a-3b show examples of HMI (human-machine interface) input of parameters by the crew: input of proprietary information (FIG. 3a), input of choice of families to be displayed (FIG. 3b), input of priority (FIG. 3c), FIG. 7d shows one example of a global representation of the winds over all the altitude segments correlated with the vertical flight plan, in other words with the times of passage over the segment of altitude.

From one figure to another, the same elements are identified by the same references.

DETAILED DESCRIPTION

Figure 1:
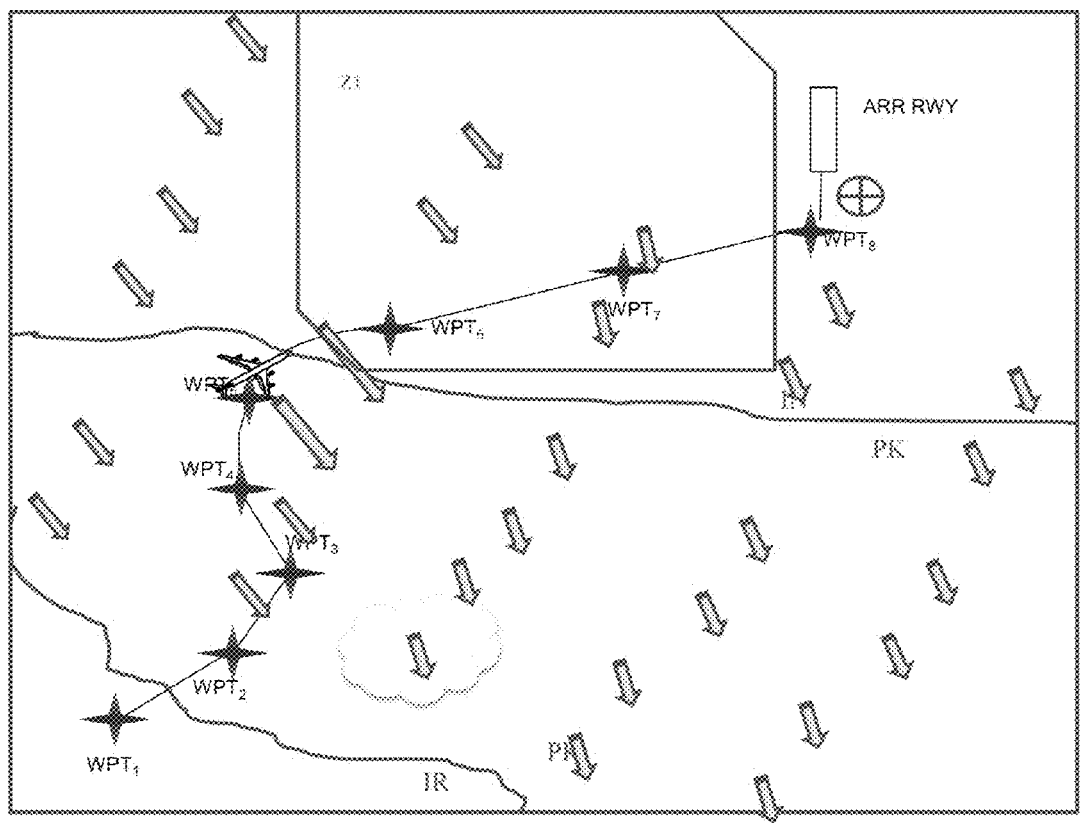
FIG. 1, already described illustrates schematically a method for displaying a flight plan with a superposition of a static wind chart according to the prior art.
Figure 2:
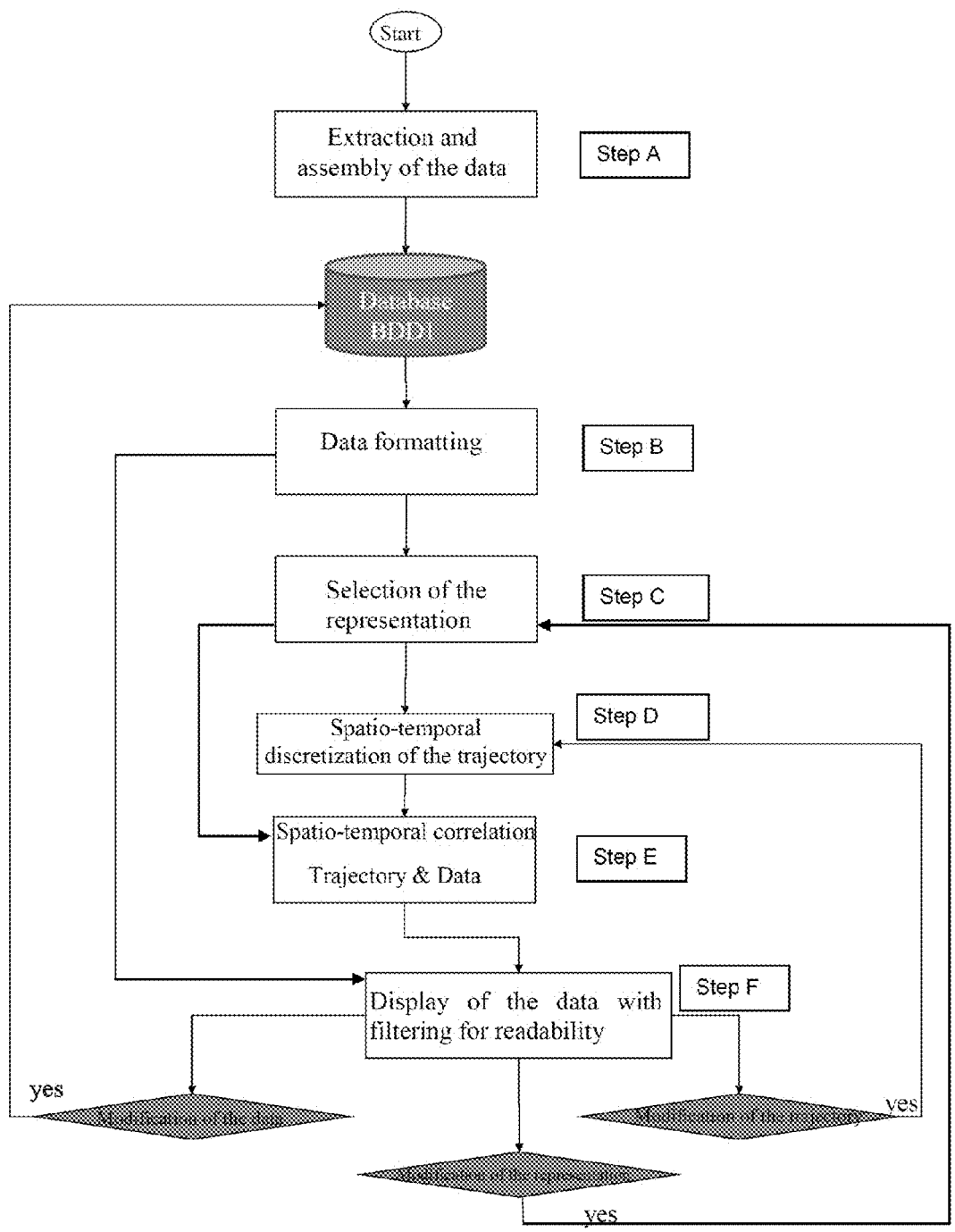
FIG. 2 is a flow diagram of one example of a method according to the invention.

The various steps of the method according to the invention are described with reference to the flow diagram in FIG. 2.

Step A: extraction of the data—insertion into a database BDD1 by families of data and potentially sub-families of data.

This first step consists in acquiring the relevant data to be displayed, via the various sensors and systems available. The lists provided hereinbelow are not exhaustive, but allow the operation of the method to be understood. This data will form a database BDD1 within which they are assembled by families.

During this step, the meteorological data are extracted in the following manner:
  Wind and temperatures via digital data uplinks: the wind data can currently be transmitted in the form of digital messages (according to the standard ARINC702A, for the AOC (Airline Operation and Communications) part containing:
    The geographical coordinates of the wind vector (latitude/longitude/altitude);
    The wind vector at this point: longitudinal wind speed and vertical wind speed, wind direction;

The time and the duration of validity of the forecast, for example using the process described in the THALES Patent (US2007/179703 "Process taking into account a local and favourable situation not conforming to a general meteorological forecast");

The geographical coordinates of the scalar "temperature" (latitude/longitude/altitude);

The temperature at this point;

The pressure and the humidity at this point in the same manner (coordinates+variation over time), for example using the method described in the aforementioned Patent.

Weather forecast by on-board charts: the wind data can currently be loaded into a database according to the same structural model as previously indicated.

Weather forecast coming from detection systems carried on board the aircraft such as weather radar:

Current weather radar systems have functionalities for measuring the wind speed within the cone viewed by the radar. This data is precise but only valid near (a few tens of NM) to the aircraft. A wind vector can therefore be determined, its date of validity being the current time, and its geographical coordinates being those of the radar echos.

These weather radar systems also allow the nebulosity to be measured, and hence include data on humidity and temperature.

Weather volumes: clouds, jetstreams, turbulences, ice formation regions. This information exists in chart form valid on a given date which is superposed onto the trajectory, as provided in the document US2011/0102192, §[0030]. By coupling this data to an image processing carried out on the ground, these surfaces are transformed into exploitable digital objects such as polygons in the case of surfaces and polyhedra in the case of volumes.

Weather data input by the crew via their human-machine interfaces (HMI).

The following geographical data are extracted in the same way via digital data uplinks and by using on-board charts:
 Borders between states,
 Air-space sectors, regional air spaces (FIR),
 Regional air spaces with limited open hours,
 Oceanic routes with limited open hours.

The navigational data is extracted in the same way via digital data uplinks and by using on-board Notams:
 State of the satellite constellations,
 State of the radio-navigation beacons; under maintenance, out of service, with limited service, etc.

This step also allows data to be displayed to be manually defined, either for replacing data that have not been digitized and are not therefore extractable for the other systems or available via datalink, or for inserting 'proprietary' data which do not belong to the list of data types expressed hereinabove.

In order to be exploitable by the following steps, and as illustrated in FIG. 3a, the proprietary data are characterized by:

A name amongst which may be mentioned "Contact airline" ("Contact AOC") as shown in the example in the FIG. 3a, or "Main cabin data" (such as sleeping phases, distribution of meals, etc.), etc.

A date for start and end of validity

A priority that will be used in the later filtering step,

A type of graphical representation which may be in the form of text, such as: event in time, geographical point (given by latitude/longitude, altitude), vector (given by a geographical point, an intensity and a direction), surface (set of geographical points defining a surface) or volume (set of surfaces).

The non-proprietary data are also characterized in the same manner.

The set of these data values is integrated into a database BDD1 in which they are assembled by families examples of which are given in the step C.

Furthermore, for data of the same type, for example the wind data, coming at the same time from the radar weather, from the on-board charts and from updates via digital data uplinks, a "tag" (ex: WINDS) and a degree of reliability in time or distance is associated with these data, in order to allow the following steps to operate on this set of mutually coherent data, and the data of different types to be well separated.

Step B: formatting of the data.

During this step, the data values are formatted as a function of their type: events, scalars, vectors, surfaces and volumes, all associated with a time window of validity. For an one-off event, the time window is reduced to a date of occurrence.

The following operations are carried out:

Ordering of the data from the same family. The data from the same family are collected in the BDD1. Advantageously, some data are eliminated in place of other data when conflicts are detected as regards reliability. Typically, for data coming, at the same time, from an external system, from a digital data uplink and from an on-board chart at the start of the flight, a sorting process is carried out:

The data values coming from measurements of on-board systems are judged to be the most reliable on the spatio-temporal scale of the system performing the measurement. For a weather radar for example, the data corresponding to the geographical region being scanned are the most reliable in a short-term time frame (e.g. 15 min);

Then, the data received by digital data uplink are used instead of the data coming from on-board charts prior to the flight, when there is a conflict i.e. the same data is defined at the same location (to within a given tolerance) with a common time window of validity.

Calculation of the spatio-temporal (4D) variation function of the data except where the data is of the event type; the following fields are accordingly constructed:
 wind vectors,
 scalars: temperature, navigation beacons, oceanic routes,
 surfaces: isobar, iso-icing levels, fronts, countries traversed,
 volumes of clouds, of jets, regions of turbulence, air spaces, airways with limited open hours.

These fields have a time window of validity.

Step C: Selection for the display.

In order to guarantee the correct understanding of the operational situation by the crew, and in order to allow them concentrate where necessary on the important parameters for the flight, a selection step (or filtering step) for the data to be displayed is carried out so as not to clutter the overall display. A parameter presetting may be provided or defined by the policy of the airline via a software configuration.

A selection of the information to be displayed is made, by family, then by sub-family, and where appropriate, by type of representation and/or by priority of the information.

Amongst these families may be mentioned, as shown in the example in the FIG. 3b:
METEO→data associated with the weather—single point or vector
CLOUDS→graphical meteorological data (volumes)
AREAS→geographical data
NAVAIDS & GNSS→localization aids
DAY/NIGHT→sunrise and sunset areas
CUSTOM→data that may be manually inserted by the crew or received via uplink.

For each family and for each sub-family, examples of which are cited in the following part, a priority (not to be confused with the priority associated with each data value) may be chosen by the crew so as to only display the required information. An selection HMI allows the priorities to be chosen, for example P1, P2, P3. In the example of choice of priority shown in FIG. 3c, it has been chosen to only show the selected data (SEL is enabled) and with a priority P1 (i.e. strictly with a higher priority than P2) from amongst the 3 families selected in the preceding HMI in FIG. 3b. As shown in this example in FIG. 3c, a geographical region (at 10 NM) and/or a time window (−20 min-+40 min) can also be selected.

The method according to the invention allows various display parameters to be chosen.

For the data to be displayed "around the trajectory" or "ALOFT AREA" which is the display option indicated with FIG. 3c (and not in the latter), the method according to the invention allows the spatial corridor around the trajectory within which the data will be displayed to be chosen. This may be a corridor of the "lateral band" type around the trajectory, or a corridor of the "circle around the trajectory" type. By default, only one corridor is provided, but a different corridor by sub-family could be provided. The corridor is lateral for lateral data; a vertical corridor could also be defined for the displays on the vertical display screen.

Figure 6A:
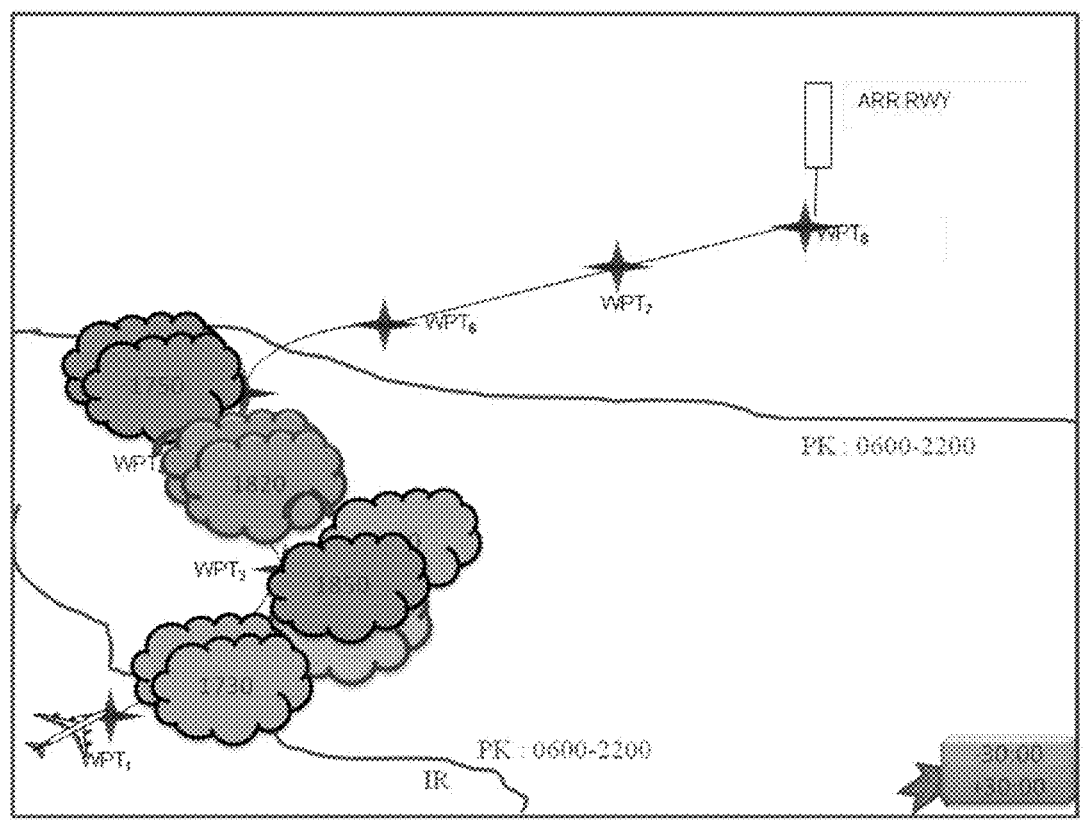
FIGS. 6a and 6b illustrate the problem of filtering of information (cloud banks) to be correlated with the trajectory, with an insufficient filtering (FIG. 6a), and adapted filtering (FIG. 6b)
Figure 6B:
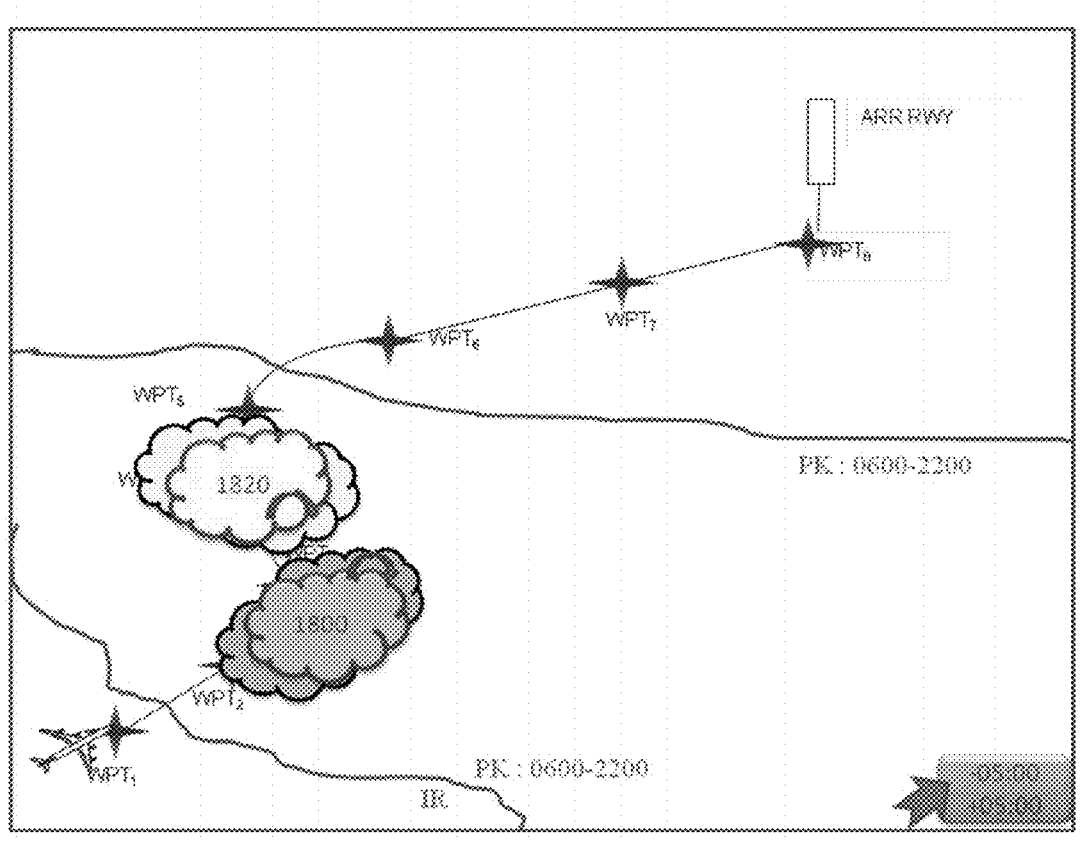

The method also allows filtering of the data to be displayed according to the time window in which they occur, with respect to the predicted times along the trajectory. Thus, in the example hereinabove, it may be choen to only extract the data occurring 20 min before and 40 min after the predicted time at each point of the trajectory. A choice of 0 min before and 0 min after allows the data to be displayed that is exactly temporally correlated with the trajectory. This functionality is illustrated in FIGS. 6a and 6b. In the example in FIG. 6a, the time window chosen is situated between −30 min and +30 min as indicated on the bottom right. However, two cloud banks are overlapping:
one intersecting the point of passage WPT3 at 18 hrs, whose time variation is displayed between 17:30 and 18:30 and which is in part covered by
the other which intersects the point of passage WPT4 at 18:20, whose time variation is displayed between 17:50 and 18:50.

Thus, a bank of clouds intersecting the WPT3 may be masked by the bank of clouds intersecting the WPT4. In FIG. 6b, the display time windows situated between −5 min and +5 min have been limited. The overlapping is thus avoided the visibility is improved.

According to one variant, this selection of the time window for each family may also be carried out during the step E for correlation of the data with the trajectory.

Examples of sub-families potentially with associated priorities will now be given.

Figure 4A:
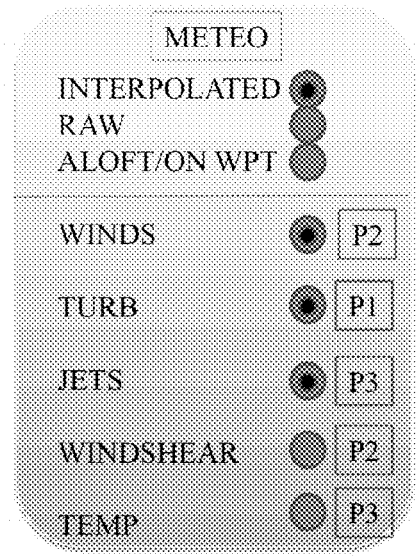
FIGS. 4a-4e show examples of HMI input of sub-families to be respectively displayed categorized by their priority and by the mode of display for the family METEO (FIG. 4a), for the family CLOUDS (FIG. 4b), for the family NAVAIDS & GNSS (FIG. 4c), for the family AREAS (FIG. 4d), for the family CUSTOMS (FIG. 4e)

The family METEO, one example of which is shown in FIG. 4a, comprises the display mode and the following sub-families:
The display mode: INTERPOLATED/RAW/ALOFT/ON WPT
INTERPOLATED or RAW allows either the data interpolated from the charts to be displayed so as to produce a given Lat/Long grid (e.g. display of the grids of winds every degree or ½ degree), or the "raw" data (RAW) from the chart such as supplied in the BDD1. In the example in the figure, the mode INTERPOLATED is chosen.
ALOFT/ON WPT allows the winds around the trajectory or on the points to be displayed (ON WPT requires the sub-category INTERPOLATED).
WINDS→display of the fields of wind vectors; in the example in the figure, this sub-family is selected for displaying with a priority P2,
TURB=display of the areas of turbulence (Volumes); in the example in the figure, this sub-family is selected for displaying with a priority P1,
JETS→display of the jet-streams (volumes; strong currents at high altitude); in the example in the figure, this sub-family is selected for displaying with a priority P3,
WINDSHEAR→display of the wind-shear areas; in the example in the figure, this sub-family is not selected for displaying but has a priority P2,
TEMP→display of the temperature; in the example in the figure, this sub-family is not selected for displaying, but has a priority P3.

Figure 4B:
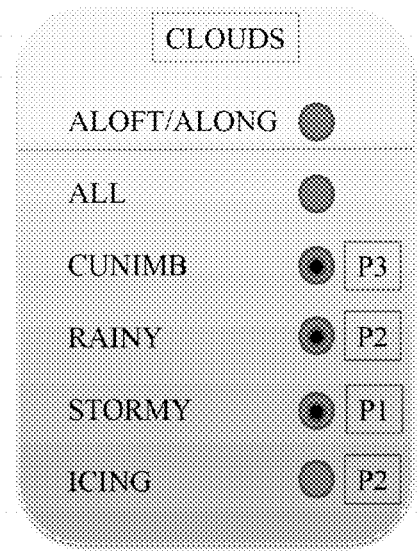

The family CLOUDS, one example of which is shown in FIG. 4b, comprises the display mode and the following sub-families:
The display mode:
ALOFT/ALONG→allows the nebulosity around the trajectory or on the trajectory to be displayed (i.e. those that intersect the trajectory.
ALL→display of any type of nebulosity
CUNIMB→display of Cumulonimbus only (the most dangerous clouds for flights); in the example in the figure, this sub-family is selected for displaying with a priority P3,
RAINY→display of the clouds in which it is raining; in the example in the figure, this sub-family is selected for displaying with a priority P2,
STORMY→display of the clouds with a high speed variation, and lightening; in the example in the figure, this sub-family is selected for displaying with a priority P1,
ICING→display of the ice-forming clouds; in the example in the figure, this sub-family is not selected for displaying but has a priority P2.

Figure 4C:
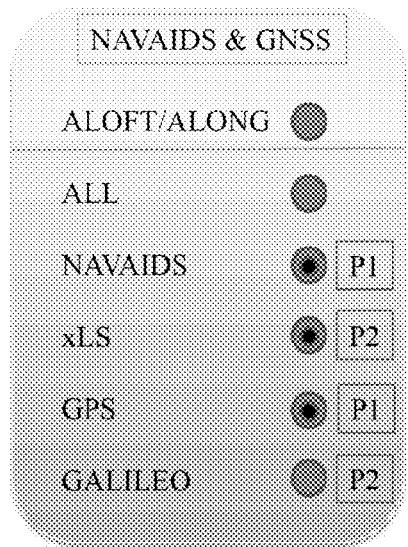

The family NAVAIDS & GNSS, one example of which is shown in FIG. 4c, comprises the display mode and the following sub-families:
The display mode:
ALOFT/ALONG→allows the beacons and satellite receptions around the trajectory or on the trajectory (i.e. those that intersect the trajectory) to be displayed.
ALL→display of any type navigation aid,
NAVAIDS→allows ground radio-navigation beacons to be displayed; in the example in the figure, this sub-family is selected for displaying with a priority P1
XLS→display of radio-navigation beacons for assisting in the approach phase (ILS, MLS, GLS, FLS, SLS etc.);

in the example in the figure, this sub-family is selected for displaying with a priority P2, GPS→display of the state of the GPS constellation in the area, in the example in the figure, this sub-family is selected for displaying with a priority P1, GALILEO→display of the state of the constellation GALILEO in the area; in the example in the figure, this sub-family is selected for displaying with a priority P2.

The list is not exhaustive; it corresponds to the reception hardware capacities of the aircraft.

Figure 4D:
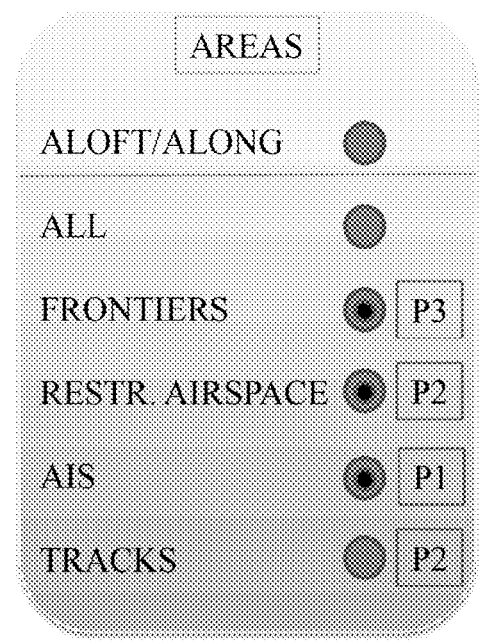

The category AREAS, one example of which is shown in FIG. 4d, comprises the display mode and the following sub-families:

The display mode:
ALOFT/ALONG→allows the geographic regions around the trajectory or on the trajectory (i.e. those that intersect the trajectory) to be displayed.

ALL→display of any type of geographical features (incl. mountains, rivers, land sea. etc.)

FRONTIERS→display of the borders between states; in the example in the figure, this sub-family is selected for displaying with a priority P3, REST. AIRSPACE→display of the state of the air spaces traversed (volumes of spaces and characteristics of permissions for overflight) as a function of the times; in the example in the figure, this sub-family is selected for displaying with a priority P2, AIS→display of the aeronautical information (Airways, FIR, terminal areas, etc.); in the example in the figure, this sub-family is selected for displaying with a priority P1, TRACKS→display of the oceanic routes (routes published daily for the ocean crossings) and of their times of opening/closing; in the example in the figure, this sub-family is not selected for the display but has a priority P2.

The list is not exhaustive.

Figure 4E:

The family CUSTOMS one example of which is shown in FIG. 4e, comprises the display mode and the sub-families defined by the pilot:

The display mode:
ALOFT/ALONG→allows information to be displayed around the trajectory or on the trajectory (i.e. that which intersects the trajectory).

ALL→display of any type

In the example in the figure, there are, for example, a contact reminder from the airline, the service hours of the PNC (flight personnel) for the main cabin meals, and a change of crew.

This list is not exhaustive.

The family DAY/NIGHT does not have any sub-family. With a knowledge of the ephemerides, and hence for a country traversed the sunset and sunrise times (local time), the UTC time is calculated with the local time offset of the geographical region. For example, in a country where the time offset is +6 hrs (i.e. it is 18:00 hrs when it is noon UTC), and where the local sunrise time is equal to 07:45, the UTC time stored for sunrise will be 01:45.

Step D: Spatio-temporal discretization of the trajectory.

In order to assist with the trajectory spatio-temporal correlation and data for the following step, an intermediate step for processing of the predicted trajectory is carried out. From the trajectory (points en route, straight segments and bends, vertical profile in altitude and in speed, predicted times of passage at the various points), a characteristic point TRAJ(i) is saved, given by:

Latitude/Longitude/Altitude,

Predicted time,

Speed could be included, potentially, Distance to the destination ("Dist to Dest") equal to 0 at the destination, or distance from aircraft equal to 0 at the current position of the aircraft, Tag: "Point of trajectory" where required.

For segments that are too long (more than 3 minutes in length for example, but the value may be chosen to be different), the trajectory is discretized and characteristic points are added.

A succession of 3D geometrical elements characterized by a start time and an end time are therefore obtained.

The trajectory is composed of N elements TRAJ(i), for i=1 . . . N.

Step E: Trajectory spatio-temporal correlation and data for determining the objects that intersect the trajectory; the goal is to determine around each element TRAJ(i) of the trajectory, the data geographically present according to a given spatial window and within a given time window with respect to the predicted time at the said element (window=−X minutes; +Y minutes). The data to be displayed is sorted by verification of their distance with respect to the trajectory, and by verifying their time of occurrence with respect to the predicted times along the trajectory.

If the data is of the event type (e.g.: sunrise):
the indice k from amongst 1, . . . , N−1 is sought such that:
Time(TRAJ(k))<=UTC sunrise time<=Time(TRAJ(k+1)). For example for the "Dist To Dest", in order to create the characteristic point "DAY" (of the same structure as the points TRAJ, with a tag corresponding to the event).

Thus, for the event "sunrise" (or DAY), a point DAY (lat, long, alt, time, speed, dist to dest, tag="DAY") will have been created.

Its coordinates and parameters are interpolated. For example, for the "Dist to Dest":

Dist to Dest(DAY)=Dist to Dest(*TRAJ(k)*)−[Dist to Dest(*TRAJ(k)*)−Dist to Dest(*TRAJ(k+1)*)]*(time (*TRAJ(k)*)−sunrise time)/(time(*TRAJ(k)*)−time (*TRAJ(k+1)*))

If the data is of the scalar field type (for example grids of temperatures in the atmosphere: TEMP(lat, long, alt, time); this is similarly applicable to other scalar data values.

```
Set i: ==1
While i < N (N = last element of TRAJ), do:
    Get the element of TRAJ: TRAJ(i)
    Get the latitudes, longitudes and altitudes of TRAJ(i): LAT(TRAJ(i)),
    LONG(TRAJ(i)), ALT(TRAJ(i))
    For each data value TEMP (lat, long, alt, time)
        Calculate the distance between the element TRAJ(i) and TEMP
        If the distance is less than the entry value of the corridor
        (ALOFT AREA) defined in the step C (where distance can be
        Euclidian i.e. within a ball of give radius, or projected onto the
        3D trajectory etc.),
        then
            If the time of the data Time(TEMP) is such that
            Time(TRAJ(i)) + Start Time < Time(TEMP) <
            Time(TRAJ(i)) + End Time, then
            (Start Time and End Time are defined in the step C and
            Start Time is negative)
            Store the element TEMP in the elements to be displayed
            End If
    End If
Set i:= i+1
End while.
```

If the data is of the vector field type, the same operation as for the scalar fields may be carried out.

If the data is of the surface field type, it is then a case of determining whether a polygon representing an element of the surface type intersects the trajectory within the given time window.

Figure 5A:
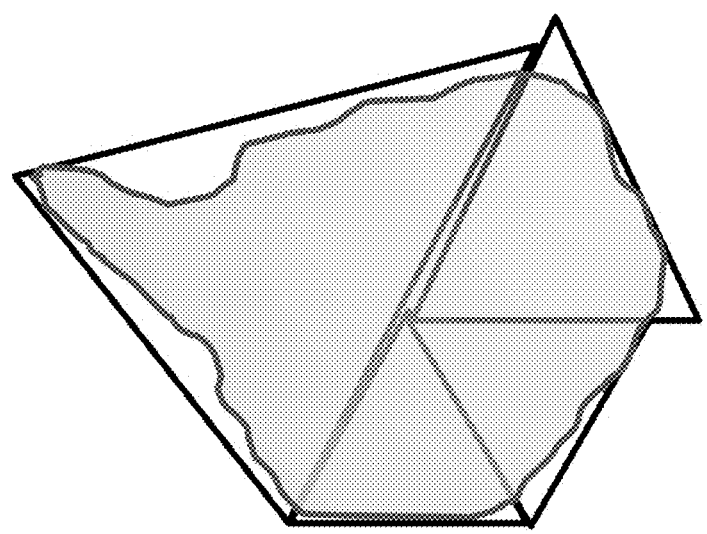
FIG. 5a shows one example of geometrical approximation of a surface by triangular facets, and FIG. 5b one example of a correlation of these facets with the trajectory at a point TRAJ(i)
Figure 5B:
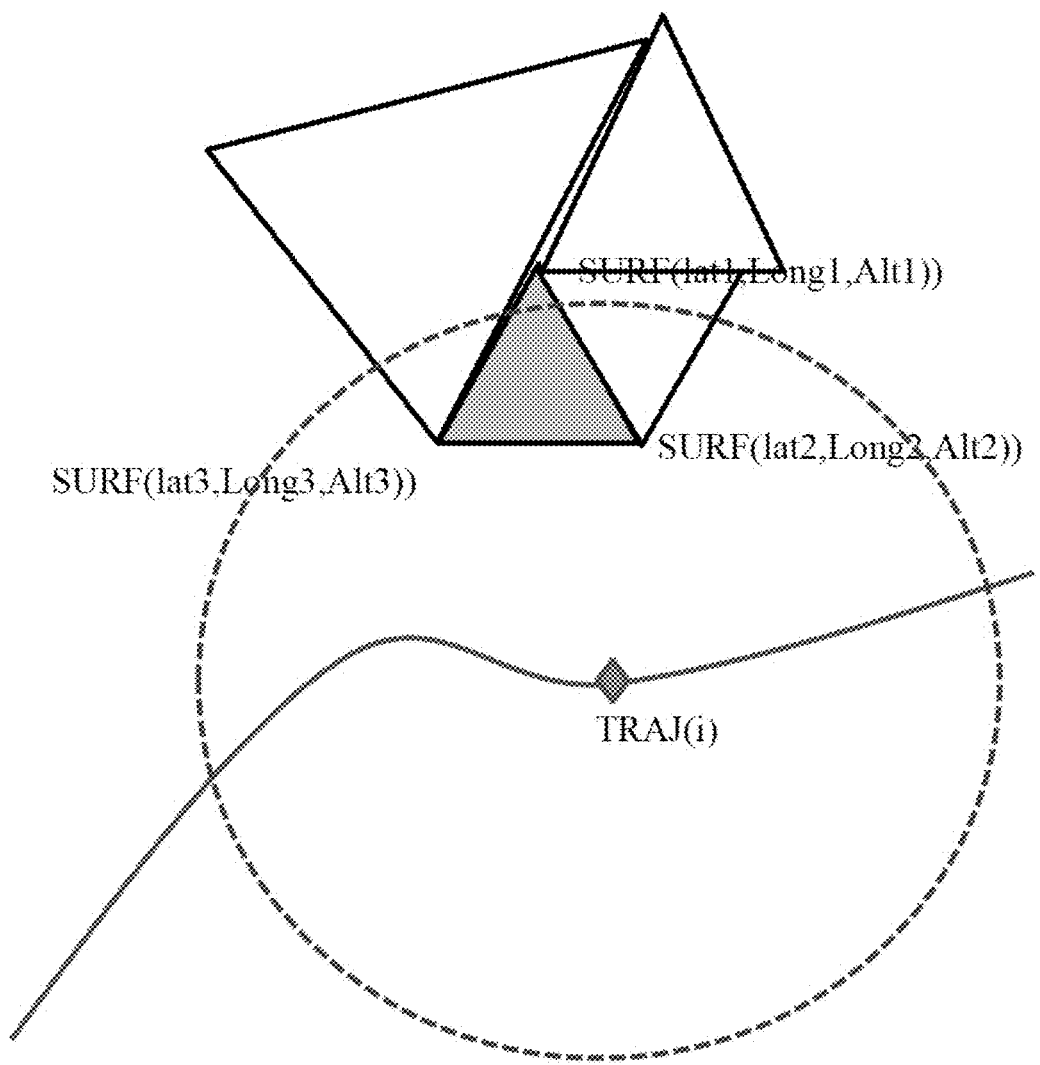

Take for example the surface defined by the atmospheric layer at 0° where the risk of icing may arise in the case of traversing this layer within a wet region of the cloud type. This surface is composed of points called SURF (lat, long, alt, time) for the icing for example. The surface is composed of contiguous facets, each facet being a triplet of points SURF as shown in FIG. 5b; functions of the prior art are used such as Delaunay triangulation (http://en.wikipedia.org./wiki/Delaunay triangulation) used for digitizing mountainous areas by creation of a mesh which determines a matrix of facets approximating a surface.

In the example in FIG. 6b, the idea is to determine if the facet defined by the triplet [SURF(lat1,long1,Alt1); SURF(lat2,long2,Alt2); SURF(lat3,long3,Alt3)] intersects the point TRAJ(i) in the red corridor with a radius R (determined in the step C), and in the time window determined by [Time(TRAJ(i))+Start Time; Time(TRAJ(i))+End Time].

The Euclidian distances are therefore calculated for example between each of the 3 points of each facet, and the point TRAJ(i).

If at least one of the points of the facet is located at a distance from the point TRAJ(i) that is less than the limit of the corridor (here the radius of the ball of radius R centred on TRAJ(i)), then the candidate surface is retained, if the time of occurrence of the candidate points is in the time segment defined by [Time(TRAJ(i))+Start Time; Time(TRAJ(i))+End Time].

Thus, the whole surface is retained: a "bit" of cloud is not displayed, but the entire cloud.

If the data is of the volume fields type, the same operations are performed as for the surface fields by considering once again an approximation of the volume using polyhedra.

Step F: Display of the data with filtering for readability according to a predetermined symbology.

This is a graphical formatting step allowing an intuitive display of the data varying with time The displays are filtered using the selection criteria of the step C.

The representation of the important data is customized, such as the priority data P1 intersecting the trajectory, with a particular scheme such as a colour for example.

A display scheme is also provided for the data varying over time, allowing its geographic displacement to be judged. For example, an arrow between the centres of gravity of the objects.

Figure 7A:
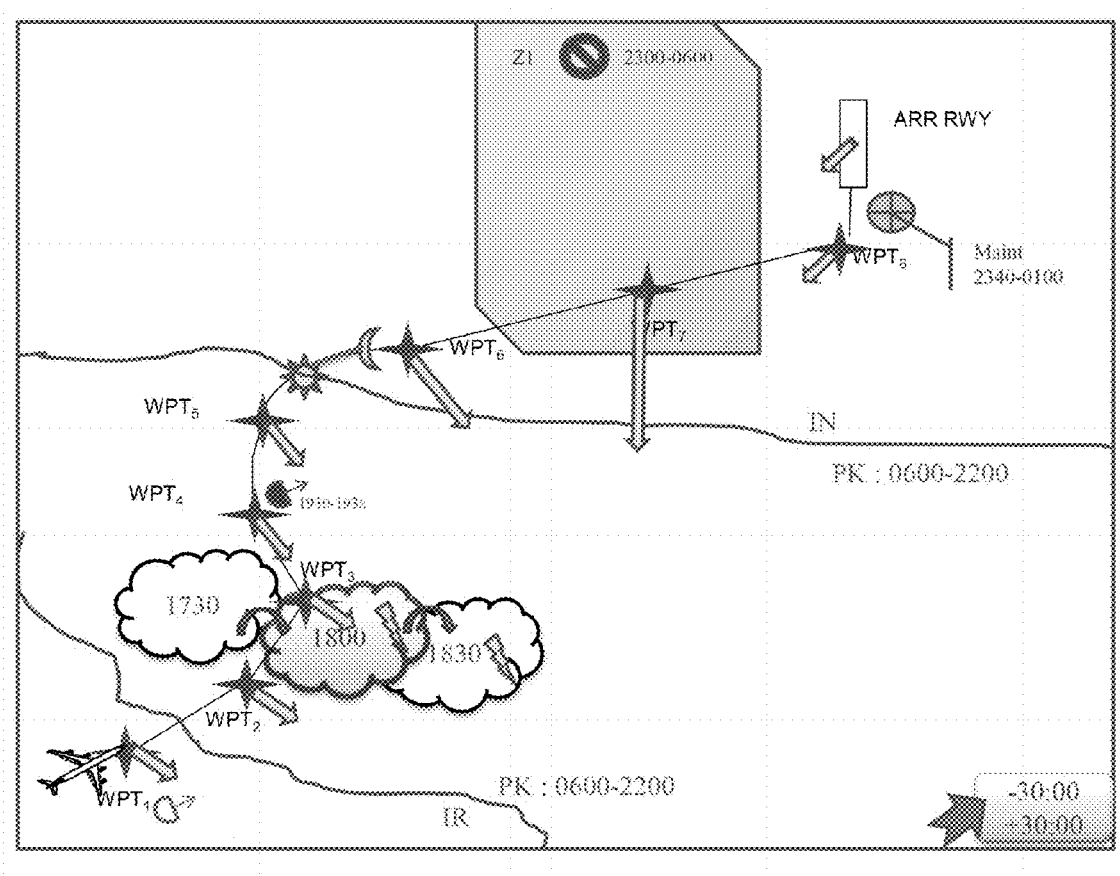
FIGS. 7a-7d show examples of correlation of filtered information of various families with the trajectory, according to the invention, with a lateral representation in an "along" display mode (FIG. 7a), a vertical representation (FIG. 7b), a lateral representation in an "aloft" display mode (FIG. 7c)
Figure 7B:
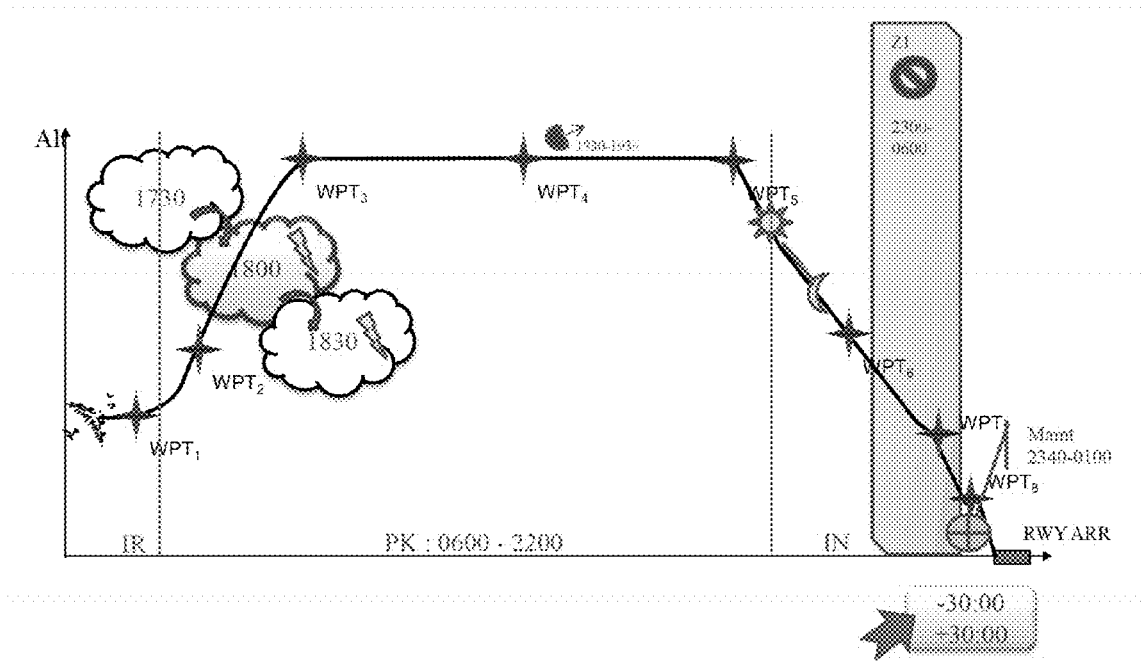
Figure 7C:
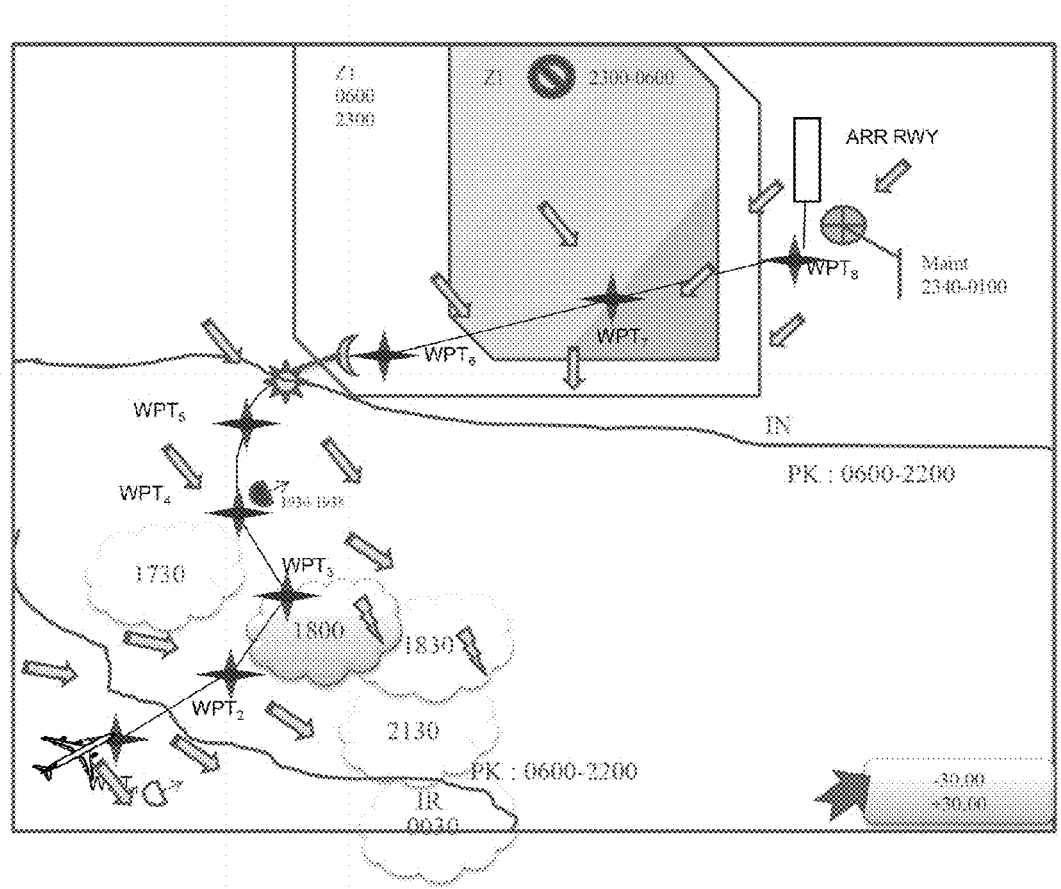
Figure 7D:
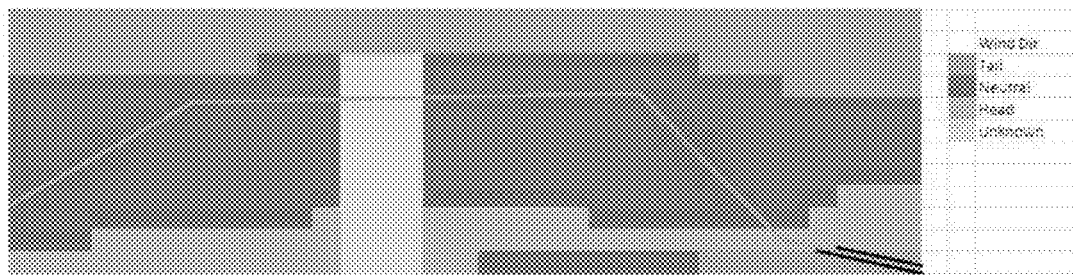

In the examples in FIG. 7, the trajectory traverses Iran (IR), Pakistan (PK) and India (IN) and information on various families are correlated over time. The figures respectively show:

a lateral trajectory displayed according to a mode "along" on the trajectory with an interpolation of the wind grid in space and time (FIG. 7a), the corresponding vertical trajectories: with no representation of the winds in FIG. 7b and with a representation of the direction of the winds in FIG. 7d. This summary of the weather over all the sections of altitudes is correlated with respect to the time of passage over the section of altitude: one colour per wind direction (simple), Head (head-wind), Tail (tail-wind), Neutral (no wind) or Unknown (no data), potentially associated with an intensity of this colour giving an indication of the force of the wind. This overview presentation allows the pilot to see if he/she is on the "best" section of altitude from the point of view of the weather information.

the horizontal trajectory with filtering and display of the winds according to a corridor around this trajectory (display mode "aloft"), FIG. 7c.

The cloud development is highlighted with a coloured edge (red for example) at the moment where the storm cloud intersects the trajectory between WPT2 and WPT3. Curved arrows allow the representations of the same cloud to be connected at different times; the time is also displayed in the shape of the cloud.

Similarly, the non-availability of the whole GNSS constellation between 19:00 hrs and 19:38, when the aircraft will be at the point WPT4, is for example represented by a red pictogramme.

The same goes for the closing of the region Z1, when the aircraft will be at WPT7, and the maintenance of the beacon between 23:40 and 01:00 hrs for landing.

As indicated on the flow diagram in FIG. 2, adjustments are subsequently made when there is a modification of the lateral or vertical trajectory by the crew, or modification of the predicted data when the real conditions encountered by the aircraft result in a deviation from the predicted trajectory: for example a slower real speed will modify the predicted times of passage at the points and will require updating, a modification of the choice of the data to be displayed, or a modification of the data to be displayed (reception of a new chart, manual modification of a customized input, etc.).

The method according to the invention allows a representation to be made of the data connected with the 4D trajectory displayed, by taking into account the time axis on time scales allowing the crew to capture on a single display the development of the predicted situation, without however cluttering the displays, in order to keep an optimum readability and appreciation of the situation.

It also allows:

the space-time scales around the predicted trajectory to be adjusted with the aim of assisting the decision (diversion, anticipated application of procedures, etc.), manual filtering of the degree of evolution to be displayed to give either only the predicted situation, its development over a near time range and around the predicted times of passage along the trajectory, or a forward prediction over the time range of the complete flight, the data that vary over time to be represented, by linking them graphically so that the spatio-temporal displacement of the said data is explicitly apparent.

It may furthermore be applied to any type of trajectory, whether this be the trajectory followed by the flight or alternative trajectories, for example work-around alternative trajectories ("What if" scenario) with a presentation of the time-correlated information for:

ETOPS or diversion trajectories, an avoidance flight plan, optional side routes, following flight plans, work-around flight plans for "engine failure", flight plans at different levels.

Figure 8A:
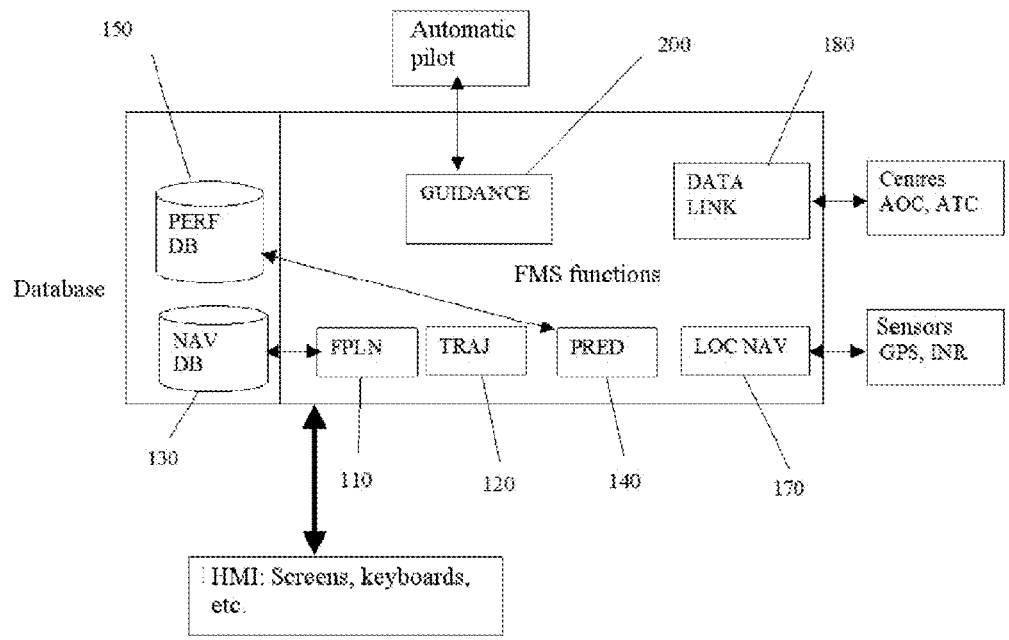
FIGS. 8a-8b show one example of FMS (FIG. 8a) and various examples of implementation of the method according to the invention: included within the FMS or within an EFB (FIG. 8b), included within a multi-system module connected to an FMS (FIG. 8c), included within a CDS connected to an FMS (FIG. 8d).

The method can be implemented in a computer of the FMS type, or in an FM ("Flight Management") function of a computer. FIG. 8a shows an FMS disposing of the following modules described in the standard ARINC 702 (Advanced Flight Management Computer System, December 1996). The provide all or part of the following functions:

Navigation LOCNAV, 170, for carrying out the optimum localization of the aircraft depending on the means of geo-localization (GPS, GALILEO, VHF radio beacons, inertial central processor);

Flight plan FPLN, 110, for inputting the geographical elements constituting the skeleton of the route to be followed (departure and arrival procedures, waypoints, airways);

Navigation database NAVDB 130, for constructing geographical routes and procedures using data included in the databases (points, beacons, interception or altitude legs, etc.);

Performance database, PRF DB 150, containing the aerodynamic and engine parameters of the aircraft;

Lateral trajectory TRAJ, 120 for constructing a continuous trajectory starting from the points on the flight plan, while complying with the aircraft performance parameters and the confinement constraints (RNP);

Predictions PRED, 140 for constructing an optimized vertical profile on the lateral trajectory;

Guidance, GUID 200, for guiding the aircraft in the lateral and vertical planes over its 3D trajectory, while at the same time optimizing its speed;

Digital data uplink DATALINK, 180 for communicating with the air traffic control centres and with other aircraft.

Based on the flight plan defined by the pilot in the form of a list of passing points, known as "waypoints" (WPT), the lateral trajectory is calculated as a function of the geometry between the waypoints (commonly referred to as LEG) and/or the altitude and speed condition which are used for the calculation of the turning radius.

On this lateral trajectory, the FMS optimizes a vertical trajectory (in altitude and speed), including potential constraints of altitude, of speed, or of time.

All of the information input or calculated by the FMS is assembled on display screens (MFD (acronym for "Multi-Function Display") pages, ND (acronym for Navigation Display) screens and PFD (acronym for Primary Flight Display), HUD (acronym for "Head Up Display") or other).

Figure 8B:
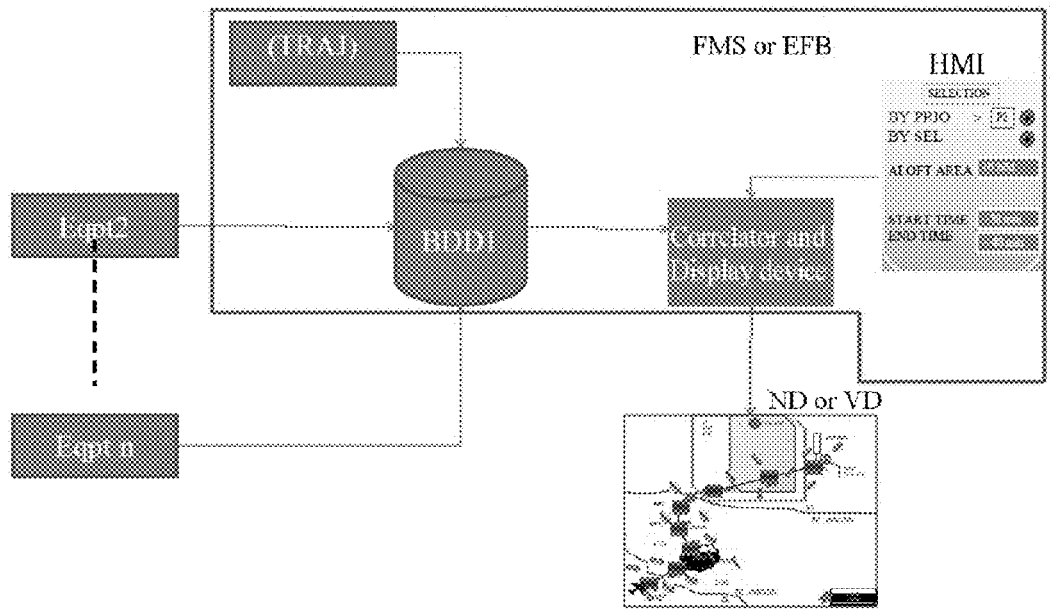

According to a first embodiment described with reference to FIG. 8*b*, the BDD1 is hosted in the FMS as a new database in which the data from the equipment (sensors, etc.) other than the FMS are stored.

The potential discretization of the trajectory is carried out by the module TRAJ.

The selection of the data is carried out by the selection HMI.

Based on the selections carried out by the pilot, the correlation of the time data is carried out by the module PRED, together with the conditioning and the transmission of the data to the display screens, the trajectory and the data being transmitted to the display screens in the cockpit (Navigation Display and/or Vertical Display).

Certain functions may be provided by modules integrated into an EFB (Electronic Flight Bag), an ANS (Airport Navigation System, i.e. ground taxiing system) or a portable PC or tablet, or lastly onto screens of ground tools, with for example a dedicated correlation system.

Figure 8C:
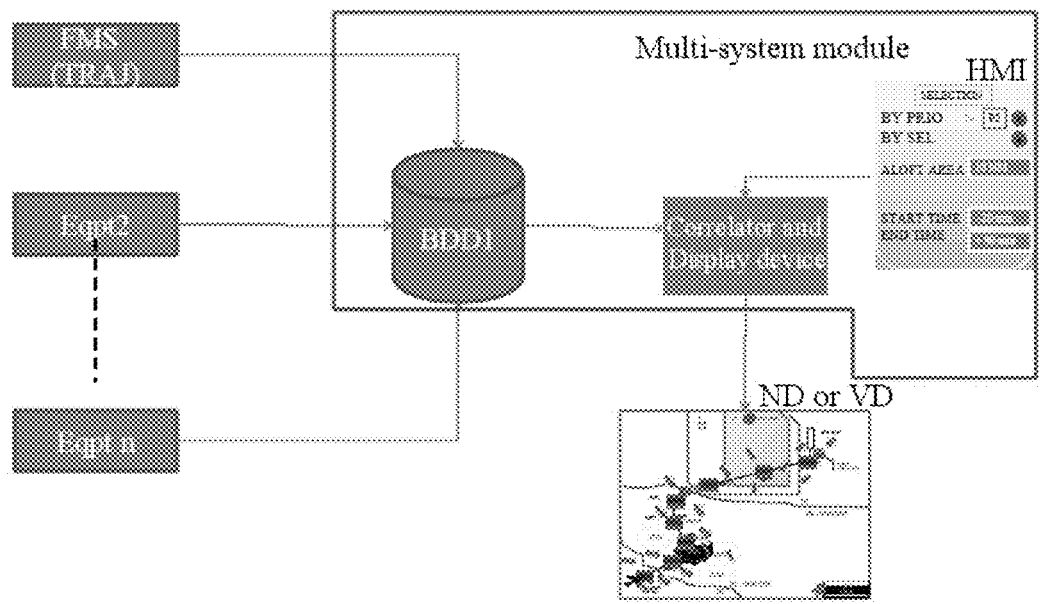

According to a second embodiment described with reference to FIG. 8*c*, the FMS (or EFB or ANS) supplies the trajectory to the BDD1. The other equipment (ground or on-board) sends the data to be displayed in the BDD1. A correlator is responsible for the exploitation of the data from the various pieces of equipment, on the basis of pilot selections via the selection HMI. The correlator formats the trajectory and the data and sends them to the CDS for displaying.

Figure 8D:
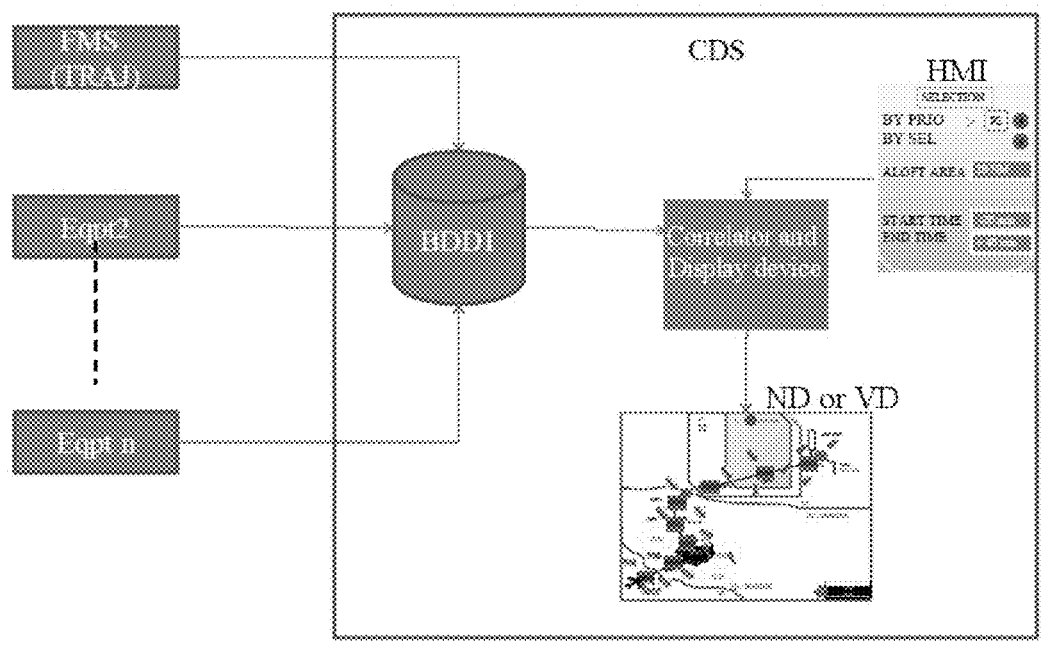

According to a third embodiment described with reference to FIG. 8*d*, the correlation of the data with the trajectory is carried out by the CDS, on the basis of pilot selections made via the selection HMI. According to this embodiment, the FMS (or EFB or ANS) supplies the trajectory in the BDD1. The other equipment (ground or on-board) sends the data to be displayed in the BDD1.

Other embodiments are possible in which the BDD1 is no longer a centralized database, but each piece of equipment stores its data and, during the correlation step, the data from each piece of equipment is read.

The invention claimed is:

1. A method for assisting the navigation of an aircraft equipped with
   sensors,
   a spatio-temporal trajectory processor,
   means of storing predetermined data and data acquired in course of navigation, including meteorological data,
   means of displaying the spatio-temporal trajectory and data, including the meteorological data, on the same display screen,
   a unit for processing sensed, predetermined and acquired data and the trajectory data,
   the method comprising the following steps:
   assembly by families of data by the processing unit, of the predetermined data and of the acquired data, the families being predefined, each data value being furthermore associated with a time window of validity,
   formatting of the data of the families in order to associate with each data value a type of graphical representation in the form of text or of a scalar or of a vector or of a surface or of a volume,
   selection of families of data to be shown;
   said method further comprising the following steps:
   for each family of data to be shown, choice of the duration of a time window designed to be used during the display step,
   for each family of data to be shown having geographical characteristics, choice of a spatial window around the trajectory
   used during the display step,
   discretization of the spatio-temporal trajectory, in order to determine elements of the trajectory defined by geographical coordinates and a predicted time of passage,
   for each element of the trajectory:
   extraction by the processing unit of a sub-assembly from each family of data as a function of the time window of validity of the data with respect to the geographical coordinates and to the predicted time of the said element, and
   extraction by the processing unit of a sub-assembly from each family of data having geographical characteristics as a function of the spatial window with respect to the geographical coordinates and to the predicted time of the said element,
   in order to obtain a spatio-temporal correlation of the discretized trajectory with each family of data, and
   display of the sub-assemblies of a family of extracted data in a single representation on the same display screen as the spatio-temporal trajectory, as a function of the type of graphical representation and of the duration of the time window associated with each family of data and of the spatial window associated with each family of data with geographical characteristics.

2. The method for assisting the navigation of an aircraft according to claim 1, wherein the choice of the families to be displayed is predetermined or determined by the crew or automatically.

3. The method for assisting the navigation of an aircraft according to claim 1, wherein priorities are chosen for families and/or sub-families.

4. The method for assisting the navigation of an aircraft according to claim 1, wherein a degree of reliability being associated with data, the formatting step is furthermore carried out by degree of reliability.

5. The method for assisting the navigation of an aircraft according to claim 1, wherein the families of data are a family of meteorological data and a family of geographical data and/or a family of navigational data and/or a family of data supplied by the crew.

6. The method for assisting the navigation of an aircraft according to claim 1, wherein sub-families being associated with data, the assembly step is furthermore carried out by sub-families.

7. A system for assisting the navigation of an aircraft, comprising:
  sensors,
  a spatio-temporal trajectory calculator,
  means of storing predetermined data and data acquired in the course of navigation including meteorological data,
  means of displaying the spatio-temporal trajectory and data including the meteorological data on the same display screen,
  a unit for processing the sensed, predetermined and acquired data and data of the trajectory, and
  wherein said system is configured to:
  assemble families of data by the processing unit, of the predetermined data and of the acquired data, the families being predefined, each data value being furthermore associated with a time window of validity,
  format the data of the families in order to associate with each data value a type of graphical representation in the form of text or of a scalar or of a vector or of a surface or of a volume,
  select families of data to be shown;
  and wherein said system is further configured to:
  for each family of data to be shown, choose the duration of a time window designed to be used during the display step,
  for each family of data to be shown having geographical characteristics, choose a spatial window around the trajectory used during the display step,
  discretize the spatio-temporal trajectory, in order to determine elements of the trajectory defined by geographical coordinates and a predicted time of passage,
  for each element of the trajectory:
    extract with the processing unit a sub-assembly from each family of data as a function of the time window of validity of the data with respect to the geographical coordinates and to the predicted time of the said element, and
    extract with the processing unit a sub-assembly from each family of data having geographical characteristics as a function of the spatial window with respect to the geographical coordinates and to the predicted time of the said element,
  in order to obtain a spatio-temporal correlation of the discretized trajectory with each family of data, and
  display the sub-assemblies of a family of extracted data in a single representation on the same display screen as the spatio-temporal trajectory, as a function of the type of graphical representation and of the duration of the time window associated with each family of data and of the spatial window associated with each family of data with geographical characteristics.

* * * * *